Patented Apr. 4, 1939

2,153,200

UNITED STATES PATENT OFFICE 2,153,200

DIAZO COMPOUNDS

Arthur R. Murphy, deceased, late of Penns Grove, N. J., by Margaret R. Murphy, Penns Grove, N. J., administratrix, and Swanie S. Rossander, Wilmington, Del., assignors to E. I. du Pont de Nemours & Company, Wilmington, Del., a corporation of Delaware No Drawing. Application August 25, 1937, Serial No. 160,854

8 Claims. (Cl. 260—169)

This invention relates to azo dyestuffs, and especially to polyazo compounds having a plurality of diazotizable end aryl amino groups coupled to intermediate naphthylamine sulphonic acids of the general formula

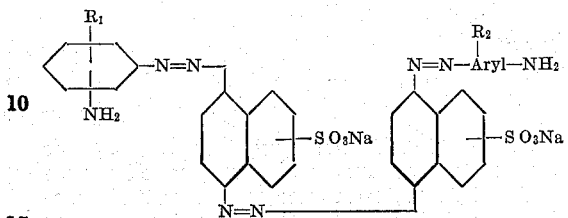

in which $R_1$ may be hydrogen, alkyl, alkoxy, aryl or halogen, $R_2$ may be hydrogen, alkyl, alkoxy, or hydroxy and aryl is the aryl nucleus of a benzene or naphthalene compound.

It is among the objects of the invention to provide dyestuffs which dye cotton, rayon regenerated cellulose and related substances, and which upon tetrazotization and development on the fibre produce shades of blue which have superior fastness to the exposures encountered by dyed fabrics. Another object is to provide polyazo dyestuff intermediates having two diazotizable end groups. Another object is to provide such diazotizable dyestuff intermediates which upon tetrazotization and development on the fibre give dyeings of desired shades technically and economically superior in fastness to the usual exposures encountered by dyed fabrics, particularly fastness to washing. Another object of the invention is to provide processes for making the compounds. Still other objects of the invention will be apparent from the following more detailed description.

The objects of the invention are attained by diazotizing an amino benzene which is para or meta substituted by a nitro or an acyl amino group which after forming the polyazo compound can be transformed into an amino group. The diazotized amino benzene is coupled to a 1:6 or 1:7-Cleve's acid. This diazo compound is diazotized and coupled to another equivalent of 1:6 or 1:7-Cleve's acid. The latter product is then diazotized and coupled to a primary arylamine having a free coupling position para to the amino group. Finally this trisazo compound is given a reducing or hydrolizing treatment to reduce the nitro or hydrolize the acylamino group, as the case may be.

The invention will be explained more in detail by reference to the examples which illustrate but do not limit the invention thereto.

Example I

Add 126 parts of oxalyl-para-phenylene-diamine to 1850 parts of water. Dissolve by cautiously adding 13 parts of ammonia or until the solution is clear and slightly alkaline to Brilliant yellow paper. Add 52 parts of sodium nitrite as a 30% solution as rapidly as it will be absorbed and cool to about 0° C. with ice. Add the solution slowly with agitation to a mixture of 600 parts water, 94 parts of hydrochloric acid and 300 parts of ice. Keep a slight excess of nitrite for 20 minutes at 0° C.

Slurry 168 parts of 1:6-Cleve's acid with 3000 parts water and add soda ash until dissolved and the solution is slightly acid to litmus. Add 120 parts of sodium acetate and cool to 10° C.

Add the oxalyl-para-phenylene diazo to the Cleve's acid solution during 10 minutes. Stir 12 hours, keeping neutral to Congo red paper and having present a slight excess of 1:6-Cleve's acid. Dissolve the solids and make the solution slightly alkaline to Brilliant yellow paper by adding 75 parts of caustic soda. Cool to 10° C. by adding ice and then add 20 percent salt.

Stir ½ hour. Add 184 parts of hydrochloric acid, followed immediately with 79 parts of sodium nitrite as a 20% solution. Diazotize 2 hours at 10–14° C. with a strong excess of the nitrite. Filter. Slurry the residue with 1300 parts water and 1200 parts of ice until well broken up, then keep the temperature below 10° C.

Dissolve 158 parts of 1:6-Cleve's acid by stirring with 2500 parts of water and approximately 37 parts of soda ash, and then add 95 parts of sodium acetate. Add the diazo slurry prepared as described in the above paragraph to the 1:6-Cleve's acid solution. Stir 12 hours, maintaining the mixture neutral to Congo red paper.

Make the mixture slightly alkaline to Brilliant yellow paper with approximately 75 parts of caustic soda, cool to 10° C. and add 10% by volume of salt. Add 187 parts of hydrochloric acid, followed immediately by the addition of 59 parts of sodium nitrite. Keep an excess of nitrite for 1 hour at 15° C.

Slurry 93 parts of cresidine with 1300 parts of water. Heat to 60° C. and add 27 parts of hydrochloric acid. Dissolve to a clear solution slightly acid to Congo red paper. Cool to 10° C. with ice and add 162 parts of sodium acetate. Slowly add the diazo suspension prepared as described in the above paragraph to the cresidine solution. Keep neutral Congo red paper and maintain an excess of cresidine. Stir 12 hours. Warm to 80° C. and add salt, 10% by volume. Make acid to Congo red paper by slowly adding approximately 54 parts of hydrochloric acid and filter off the precipitated product.

The acylamino group is hydrolyzed by the following procedure. Slurry the filter cake with 4000 parts of water for 12 hours. Then heat to 93° C. and add caustic soda until the solution shows faint alkalinity on Brilliant yellow paper. Cautiously add during about one minute sufficient caustic soda to 5% concentration and stir 10 minutes at 95–100° C. Immediately ice to 60° C. and slowly add hydrochloric acid until the mixture shows only a light alkaline reaction on Brilliant yellow paper. The product is precipitated by adding salt and stirring for ½ hour. The precipitated product is separated by filtering and dried at 80–85° C. The dried powder was dark in appearance. It is represented by the formula

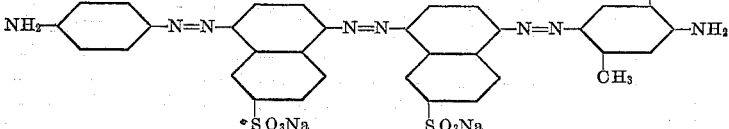

The product dissolves in water giving a blue solution.

The compound was tetrazotized and dyed on cotton and rayon fabrics by methods well known in the art. Then the dye was coupled on the fibre to beta-naphthol. The dyeing was a blue shade having good light fastness and superior fastness to washing.

*Example II*

Slurry 69 parts of para-nitro-aniline with 200 parts of water and add 750 parts of 2 normal hydrochloric acid. Cool to 10° C. and add 250 parts of 2 normal sodium nitrite. Keep a slight excess of nitrite for 1 hour and maintain a temperature of 10°–12° C.

115 parts of mixed Cleve's acid were added to 250 parts of water and to this was slowly added 250 parts of 2 normal sodium hydroxide until complete solution was obtained. 250 parts of 2 normal sodium acetate solution were added and the mixture was cooled to 10° C. This diazo was added to a solution of Cleve's acid and stirred for one hour whilst maintaining a very slight excess of Cleve's acid.

The solution was made alkaline to litmus paper by adding 500 parts of 2 normal sodium hydroxide, and 275 parts of 2 normal sodium nitrite, and 200 parts of 10 normal hydrochloric acid were added. The temperature was allowed to rise to 20–25° C., and the mixture was diazotized for 1 hour whilst maintaining an excess of the nitrite.

115 parts of mixed Cleve's in 2500 parts of water were dissolved to complete solution by adding 250 parts of 2 normal sodium hydroxide and the mixture was cooled to 10° C. Finally 250 parts of 2 normal sodium acetate solution were added. To this solution was slowly added the diazotized mixture described in the preceding paragraph. The mixture was stirred 12 to 16 hours while maintaining it neutral to Congo red paper. Then 750 parts of 2 normal soda ash solution were added until the reaction mixture showed a slight alkaline reaction to Brilliant yellow paper. The mixture was heated to 80° C., 20 percent by volume of salt was added and the mixture was filtered. The solids were washed with 2000 parts of 20% salt solution at 75° C.

The solids thus produced were slurried with 5000 parts of water, heated to 90° C., cooled to 10° C., and diazotized by adding 250 parts of 2 normal sodium nitrite, followed by 750 parts of 2 normal hydrochloric acid. Diazotization was complete in 2 hours. A slight excess of nitrite was maintained during diazotization and then the excess of nitrite was removed by the cautious addition of urea.

68 parts of cresidine in 500 parts of water were added to 250 parts of 2 normal hydrochloric acid, heated to 60° C. until the cresidine 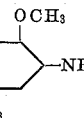 was dissolved and then cooled to 10° C. The solution of cresidine was slowly added to the diazo base prescribed in the next preceding paragraph and 500 parts of 2 normal sodium acetate were added to the mixture. Neutrality to Congo red paper was maintained and stirred 12 to 16 hours. After heating to 80° C., the mixture was made strongly acid to Congo red paper by the addition of hydrochloric acid, 10% by volume of salt was added and the solids were filtered off.

The nitro group of the azo compound was reduced as follows. The press cake was suspended in 6000 parts of water at 80° C. Soda ash was cautiously added until the solution was faintly alkaline to Brilliant yellow paper. 20% by volume of salt was added and the nitro was reduced by slowly adding 120 parts of 30% sodium sulfide solution and stirring for ½ hour. The product was separated by adding 10% of salt and filtering, and it was dried at 90°–100° C. The dried product was a dark powder, soluble in water. Its probable formula is

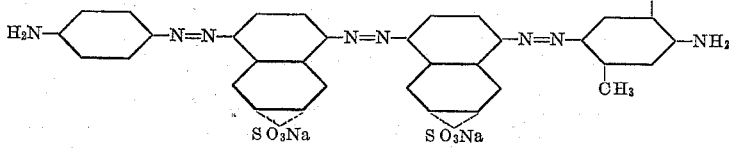

Blue dyeings were made with the compound on cotton and rayon similarly to the dyeings of Example I. These dyeings had good light fastness and excellent fastness to washing.

The following are examples of dyes having in general the properties of the dyes of Examples I and II which were made by the processes described in these examples. The arrows point from the compound which was diazotized toward the compound which was coupled to the diazotized compound. The letters P. P. D. and M. P. D. stand for the residue of para-phenylene-diamine and meta-phenylene-diamine which results when the nitro or acylamino group is transformed to the amino group after the coupling is completed.

The rest of the terms refer to the parent compound which was coupled to the diazo component.

| | Dye | Direct shade |
|---|---|---|
| 3 | P. P. D. → 1:6-Cleve's acid → 1:6-Cleve's acid → cresidine. | Blue. |
| 4 | P. P. D. → 1:7-Cleve's acid → 1:6-Cleve's acid → cresidine. | Do. |
| 5 | P. P. D. → 1:6-Cleve's acid → 1:7-Cleve's acid → cresidine. | Do. |
| 6 | P. P. D. → 1:7-Cleve's acid → 1:7-Cleve's acid → cresidine. | Do. |
| 7 | P. P. D. → mixed Cleve's acid → 1:6 Cleve's acid → cresidine. | Do. |
| 8 | P. P. D. → mixed Cleve's acid → mixed Cleve's acid → meta-toluidine. | Do. |
| 9 | P. P. D. → mixed Cleve's acid → 1:6 Cleve's acid → meta-toluidine. | Do. |
| 10 | P. P. D. → mixed Cleve's acid → 1:7 Cleve's acid → meta-toluidine. | Do. |
| 11 | P. P. D. → mixed Cleve's acid → 1:7 Cleve's acid → 2:5-dimethoxy-aniline. | Do. |
| 12 | M. P. D. → mixed Cleve's acid → mixed Cleve's acid → cresidine. | Do. |
| 13 | P. P. D. → 1:6-Cleve's acid → 1:7-Cleve's acid → m-toluidine. | Do. |

When the compounds of Examples 3 to 12 are tetrazotized and coupled on the fibre with diazo dye coupling components, such as beta-naphthol, blue shades are produced which have improved properties similar to the analogous products of Examples I and II.

As the first component para-amino-benzenes substituted by nitro or an acylamino group are preferred, but meta substituted compounds can be used. As examples of acylamino groups, acetyl, propionyl, and benzoyl-amino groups and still others which are readily hydrolized can be used. The other positions of these compounds may be substituted by one or more alkyl, alkoxy, aryl or halogen groups, such as methyl, ethyl, propyl, butyl and longer alkyl chains, the corresponding alkoxy groups, by aryl groups such as benzene and naphthalene, and halogen such as chloro and bromo.

The naphthylamine sulphonic acid groups are residues of 1:6 and 1:7-naphthylamine sulphonic acids. These acids as well as mixed Cleve's acid may be used as the basis for either or both of the intermediate components.

The end arylamine component must have an open coupling position para to the amino group. The other positions may be unsubstituted or they may be substituted by alkyl, alkoxy or hydroxy, such as the alkyl and alkoxy groups mentioned as substituents of the first component. Other examples of these components are alpha-naphthylamine, meta-anisidine, para-xylidine, and dimethoxy-aniline, but other arylamines of the benzene and naphthalene series can be used.

It is evident that considerable variation is possible in the selection of substituents and a large number of dyes having slightly different properties can be made. In using certain intermediates, such as aniline and o-anisidine for the last coupling component their omega-sulfonic acid derivatives are preferred. The sulfonic acid group is then hydrolyzed.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

What is claimed is:

1. A compound represented by the formula

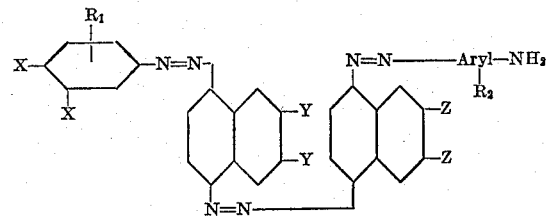

in which one X is amino and the other X is hydrogen, one Y and one Z are sulphonic acid and the other Y and other Z are hydrogen, $R_1$ is at least one of the group consisting of hydrogen, alkyl, alkoxy, aryl and halogen, $R_2$ is at least one of the group consisting of hydrogen, alkyl, alkoxy and hydroxy and aryl is one of the group consisting of benzene and naphthalene in which amino is in the 4-position with respect to the azo coupling.

2. The compound represented by the formula

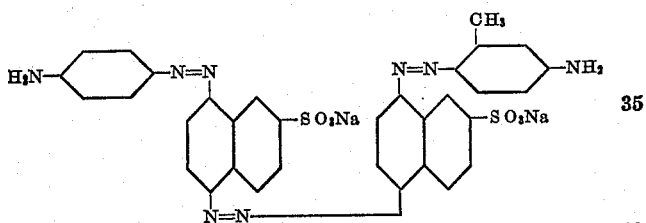

3. A compound represented by the formula

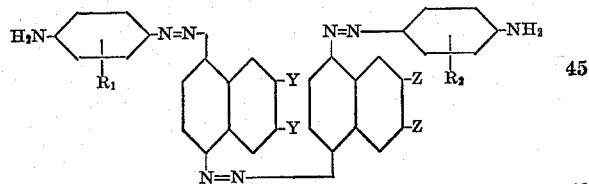

in which one Y and one Z are sulphonic acid and the other Y and other Z are hydrogen, $R_1$ is at least one of the group consisting of hydrogen, alkyl, alkoxy aryl and halogen, $R_2$ is at least one of the group consisting of hydrogen, alkyl, alkoxy and hydroxy.

4. A compound represented by the formula

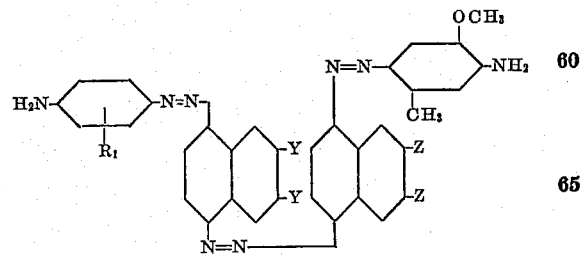

in which one Y and one Z are sulphonic acid and the other Y and Z are hydrogen, and $R_1$ is at least one of the group consisting of hydrogen, alkyl, alkoxy, aryl and halogen.

5. The compound produced by diazotizing a nitro-amino-benzene compound selected from the group consisting of meta and para-nitro-aminobenzene compounds, coupling to one of the naphthylamine sulphonic acids from the group consisting of 1:6 and 1:7 naphthylamine sulphonic acids, diazotizing the product of coupling and again coupling to one of said naphthylamine compounds, diazotizing the last of said products of coupling, coupling to an arylamine compound having an unsubstituted 4-position as referred to the amino group, said arylamine compound being selected from the group consisting of aminobenzene and naphthylamine compounds, and then reducing the nitro group of the nitro-aminobenzene residue.

6. The process which comprises coupling a diazotized amino-benzene compound selected from the group consisting of meta- and para-nitro-amino-benzene compounds and meta- and para-acyl-amino-phenylene-diamine compounds to a naphthylamine sulphonic acid from the group consisting of 1:6 and 1:7 naphthylamine sulphonic acids, diazotizing the product of coupling and again coupling to one of said naphthylamine compounds, diazotizing the last of said products of coupling and coupling to an arylamine compound having an unsubstituted 4-position as referred to the amino group, said arylamine compound being selected from the group consisting of amino-benzene and naphthylamine compounds, and then transforming said nitro or acylamino group of the first of said diazotized compounds to an amino group.

7. The process which comprises coupling a diazotized acylamino-amino-benzene compound selected from the group consisting of meta- and para-acylamino-phenylene-diamine compounds to a naphthylamine-sulphonic acid selected from the group consisting of 1:6 and 1:7 naphthylamine sulphonic acids, diazotizing the product of coupling and again coupling to one of said naphthylamine compounds, diazotizing the last of said products of coupling and coupling to cresidine, and then hydrolyzing said acylamino group.

8. The process which comprises coupling a diazotized acylamino-amino-benzene compound selected from the group consisting of an acylamino-para-phenylene-diamine compound to a naphthylamine-sulphonic acid selected from the group consisting of 1:6 and 1:7 naphthylamine sulphonic acids, diazotizing the product of coupling and again coupling to one of said naphthylamine compounds, diazotizing the last of said products of coupling and coupling to cresidine, and then hydrolyzing said acylamino group.

MARGARET R. MURPHY.
*Administratrix of the Estate of Arthur R. Murphy, Deceased.*
SWANIE S. ROSSANDER.